US008044334B2

(12) United States Patent
Kagata et al.

(10) Patent No.: US 8,044,334 B2
(45) Date of Patent: Oct. 25, 2011

(54) HIGH-PRESSURE DISCHARGE LAMP LIGHT SOURCE DEVICE HAVING A POWER SUPPLY DEVICE WITH A SWITCHING STATE FOR SWITCHING FROM A DIRECT CURRENT DRIVE IN A STANDBY STATE TO AN ALTERNATING CURRENT DRIVE IN AN OPERATING STATE AND PROJECTOR

(75) Inventors: Teppei Kagata, Himeji (JP); Tetsu Okamoto, Himeji (JP); Tetsuji Hirao, Himeji (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 189 days.

(21) Appl. No.: 12/624,901

(22) Filed: Nov. 24, 2009

(65) Prior Publication Data
US 2010/0128232 A1 May 27, 2010

(30) Foreign Application Priority Data

Nov. 27, 2008 (JP) ................................ 2008-302180

(51) Int. Cl.
 *G01J 1/32* (2006.01)
(52) U.S. Cl. .................................. 250/205; 250/214 R
(58) Field of Classification Search .................. 250/205, 250/214 R, 208.1; 315/209 R, 291, 224, 315/308, 362, 307; 353/85
See application file for complete search history.

(56) References Cited

U.S. PATENT DOCUMENTS

| 5,109,181 | A | 4/1992 | Fischer et al. |
| 6,184,875 | B1 | 2/2001 | Matsuura |
| 6,545,430 | B2 | 4/2003 | Ono et al. |
| 7,040,762 | B2 | 5/2006 | Yasuda |
| 7,239,089 | B2 * | 7/2007 | Suzuki et al. ............. 315/209 R |
| 7,358,686 | B2 | 4/2008 | Deurloo |

FOREIGN PATENT DOCUMENTS

| JP | 5-182772 A | 7/1993 |
| JP | 11-143443 A | 5/1999 |
| JP | 2000-131668 A | 5/2000 |
| JP | 2004-361466 A | 12/2004 |
| JP | 2005-522818 A | 7/2005 |
| JP | 2006-332015 A | 12/2006 |

* cited by examiner

*Primary Examiner* — Que T Le
(74) *Attorney, Agent, or Firm* — Roberts Mlotkowski Safran & Cole, P.C.; David S. Safran

(57) ABSTRACT

To stabilize the arc bright point position of a discharge lamp and suppress deformation of an electrode when an ultrahigh-pressure discharge lamp is operated with extremely low electric power, the lamp is operated by supplying power from a power supply device having a step-down chopper circuit and a full bridge circuit, a rectangular wave alternating current being supplied when it is operated with rated power or dimmed power (about 60 to 80% of rated power), a DC current being supplied during standby power operation of at most 0.5×P (W) with respect to the maximum operating power P (W). Moreover, the high-pressure discharge lamp light source device may be mounted on a projector for projecting images and the mode being changed to standby power operation when there is no change in an image signal, for example, for a prescribed period of time.

5 Claims, 11 Drawing Sheets f1: Steady operation frequency
f2: Low frequency
DC: Direct current f1: Steady operation frequency
f2: Low frequency
DC: Direct current Fig. 10 (a)
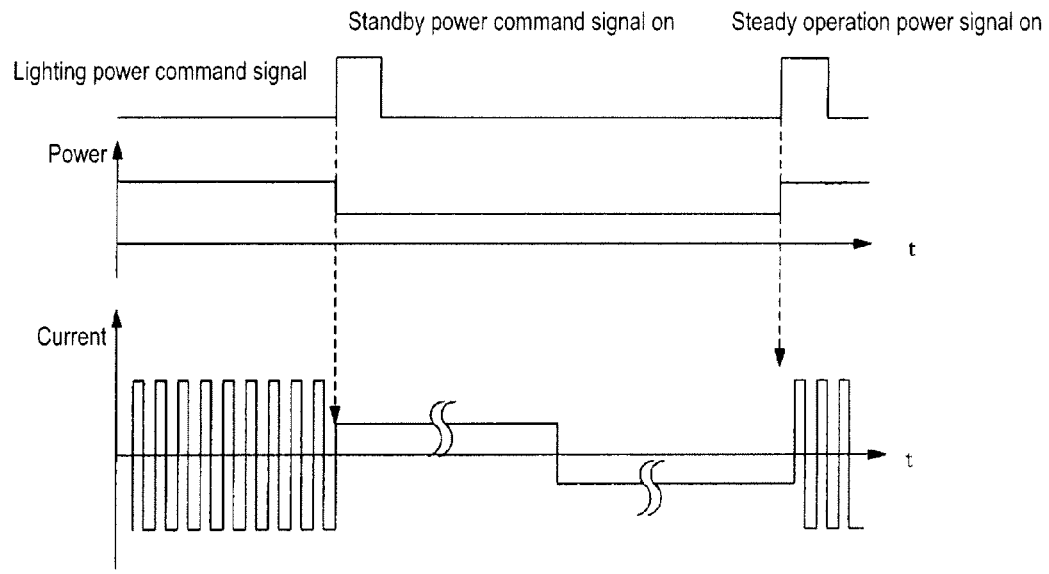
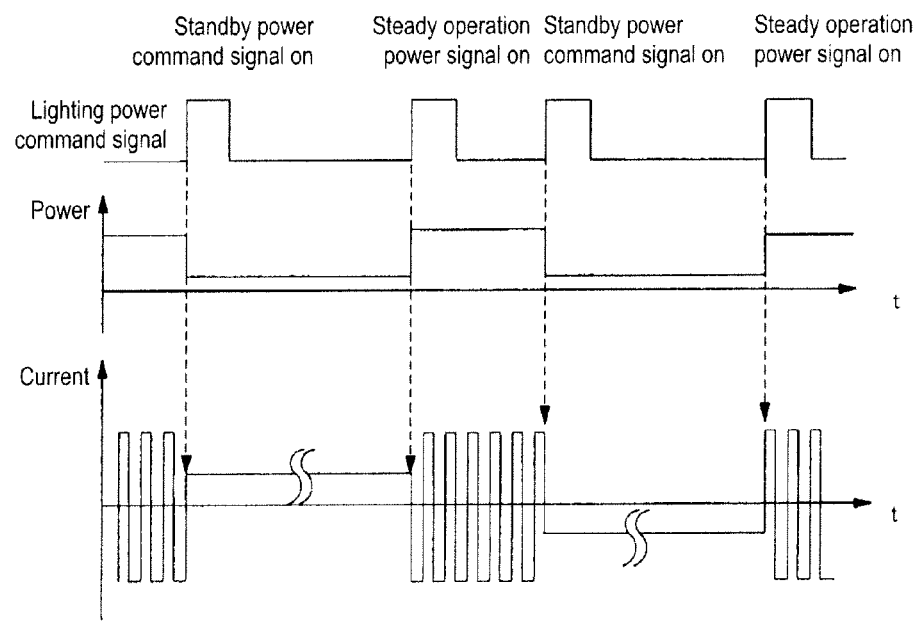
Fig. 10 (b)

HIGH-PRESSURE DISCHARGE LAMP LIGHT SOURCE DEVICE HAVING A POWER SUPPLY DEVICE WITH A SWITCHING STATE FOR SWITCHING FROM A DIRECT CURRENT DRIVE IN A STANDBY STATE TO AN ALTERNATING CURRENT DRIVE IN AN OPERATING STATE AND PROJECTOR

BACKGROUND OF THE INVENTION

1. Field of Invention

The present invention relates to a high-pressure discharge lamp light source device and a projector in which the high-pressure discharge lamp light source device is mounted. Particularly, the present invention relates to an alternating current type high-pressure discharge lamp having a light emitting tube in which at least 0.2 mg/mm$^3$ of mercury is sealed, and therefore, the mercury vapor pressure is high (e.g., 110 atm or higher), the high-pressure discharge lamp being suitably used as a projection light source for projection type projector devices, rear projection televisions and the like, a high-pressure discharge lamp light source device comprised of the high-pressure discharge lamp and its light source device, and a projector on which the high-pressure discharge lamp light source device is mounted.

2. Description of Related Art

It is required for a projection type projector device to illuminate images on a rectangular screen uniformly with sufficient color rendition. Accordingly, a metal halide lamp in which mercury or a metal halide is sealed is used as a light source. In addition, the recent trend has been to reduce the size more and more to the level of a point light source, and one having an extremely small distance between the electrodes has practically been used.

Under these circumstances, a high-pressure discharge lamp having an extremely high mercury vapor pressure (e.g., 20 MPa (about 190 atm) or higher) has recently been used in place of a metal halide lamp. The purpose of this lamp is to narrow down the width of the arc by increasing the mercury vapor pressure and further increase the light output. In the above-mentioned ultrahigh-pressure discharge lamp, a pair of electrodes is disposed inside a light emitting tube made of quartz glass in a manner of facing each other with a distance of at most 2 mm, for example, and mercury of not less than 0.20 mg/mm$^3$, a rare gas, and a halogen in the range of $10^{-6}$ μmol/mm$^3$ to $10^2$ μmol/mm$^3$ are sealed inside the light emitting tube (See, e.g., Published Unexamined Japanese Patent Application No. H2-148561 and corresponding U.S. Pat. No. 5,109,181).

This type of discharge lamp and its light source device are disclosed in Published Unexamined Japanese Patent Application No. 2001-312997 and corresponding U.S. Pat. No. 6,545,430, for example.

In the high-pressure discharge lamp disclosed in Published Unexamined Japanese Patent Application No. 2001-312997 and corresponding U.S. Pat. No. 6,545,430, the mercury vapor pressure inside the tube is in the range from 15 MPa to 35 MPa during steady lighting state; halogen in the range of $10^{-6}$ μmol/mm$^3$ to 102 μmol/mm$^3$ is sealed inside the light emitting tube; a pair of electrodes is provided inside the light emitting tube; and a protrusion is provided in the vicinity of the center of the tip end of the electrode so as to suppress the occurrence of the so-called arc jump phenomenon, the arc jump phenomenon being a phenomenon in which the position of the discharge arc generated between the electrodes becomes unstable and moves around between the center of the tip end of the electrode and the periphery thereof. An alternating voltage is applied between the pair of the electrodes for operation using a power source device comprised of a DC/DC converter, a DC/AC inverter and a high-voltage generator.

On the other hand, as the size of the projector is so reduced recently, so that it can be used in ordinary homes, there is a need for considering a screen that is not too bright in synch with the brightness of the use environment and the type of images to be projected. In response to such a need, a projector having a function referred to as the dimming function has been designed (See, e.g., Published Unexamined Japanese Patent Application No. 2000-131668). Here, the dimming function refers to a function for adjusting the brightness of a lamp and reducing the consumed electric power by operating a high-pressure discharge lamp with electric power lower than the rated electric power. As used herein, the term "dimmed power operation" refers to operation with electric power lower than the rated electric power.

The present high-pressure discharge lamp light source device is usually provided with both the "rated power operation" and the "dimmed power operation." As used herein, the operation with the "rated power operation" and the "dimmed power operation" is defined as the steady operation. Besides, the "dimmed power operation" is generally operated with electric power that is 60 to 80% of the "rated power operation."

FIG. 18 shows one example of the electric current waveform when a high-pressure discharge lamp is operated using a light source device having the dimming function. As shown in the figure, the electric power is reduced to about 60 to 80% of the rated power operation for operating a lamp when the dimmed power operation command signal is turned on during the rated power operation.

Furthermore, a projector having a function referred to as the AV mute has recently been designed, for example, that stops projecting images temporarily when the projection of images on a screen is not required.

Such a function can be achieved by mechanically shutting down the discharge lamp considering the fact that relighting is not available immediately after turning off the light of the discharge lamp because the internal pressure is high, by shutting down light to be projected onto a screen by adjusting the voltage to be applied to a liquid crystal panel, or the like. As used herein, the term "standby power operation" refers to the operation of a lamp in a state where images are not projected on a screen deliberately.

In the standby power operation, it is desirable that the power is as low as possible. This is because the operation with power as low as possible allows markedly decreasing heat generated from the lamp and stopping or significantly decreasing the drive of a cooling fan, which is the major cause of noise generated by a projector, thereby making the noise generated by the projector as small as possible.

Moreover, since the thermal load of the lamp can be reduced by operating the lamp with low electric power, the lifespan of the lamp can be prolonged by combining the case in which projection is required with the case in which projection is not required. As used herein, the term "thermal load" refers to the thermal load on the light emitting tube and electrodes, which can be reduced with smaller input power.

Besides, one of the properties of a projector is the contrast ratio. The contrast ratio refers to the ratio between the brightness on a white screen for projection (bright state) and the brightness on a black screen (dark state). When the contrast ratio is high, an image having a clear distinction between brightness and darkness can be projected and, therefore, is an important property of a projector together with the brightness.

In order to increase the contrast ratio, a technology for creating the black state using the above-mentioned shutting down function (iris adjusting function) has recently been adopted.

There is a need for a high-pressure discharge lamp that enables brightness of a prescribed level or higher during the rated power time to be achieved and allows not only for the dimmed power operation as described above, but also the standby power operation, which is achieved by lowering the dimming power as much as possible.

As described above, there is a need for a high-pressure discharge lamp that allows for the standby power operation, which is achieved by lowering the electric power as much as possible. However, the following problems may occur when the power is significantly decreased in a state where rectangular wave alternating current is being supplied.

In this type of high-pressure discharge lamps, as described in Published Unexamined Japanese Patent Application No. 2006-332015, for example, a protrusion is formed on the tip end of the electrode during operation and a stable arc discharge is formed centering on the protrusion. It is described in Japanese Patent Application No. 2006-332015 that the stable operation is possible by maintaining the protrusion, which is the starting point of an arc, wherein the stability can be achieved by changing the frequency or the number of waves of a stationary frequency and a low frequency, which is intermittently (periodically) inserted, depending on lamp voltage or lamp operation power. However, the starting point of the arc became unstable and the so-called flicker phenomenon frequently occurred when a high-pressure discharge lamp (e.g., a lamp with the rated power of 180 W) was operated with 90 W using the abovementioned technology, which problem occurred in any combination of frequencies. Particularly, this problem markedly occurred with 70 W relative to the rated power of 180 W.

In order to solve the abovementioned problem, the object of the present invention is to provide a high-pressure discharge lamp light source device that can positionally stabilize the starting point of an arc in a discharge lamp, thereby preventing the occurrence of the so-called flickers, even when the lamp operation power is extremely low, i.e., the operating power is at most 0.5×P (W) with respect to the maximum operating power P (W) in the steady operation state and that does not influence the lighting operation in the screen projection mode by suppressing the deformation of the electrode as well as a projector on which the high-pressure discharge lamp light source device is mounted.

SUMMARY OF THE INVENTION

First, the present inventors observed the starting point of an arc by gradually lowering power in order to observe the flicker phenomenon in the alternating current drive operation when operated with lower power than any conventional dimmed operation power. It was found, for example, that the projected portion, which forms the starting point of an arc, was deformed with 140 W by gradually changing the power of a lamp whose rated operation is at 180 W if the frequency is the same as that of the rated operation (the "rated frequency' as used herein). Furthermore, based on Published Unexamined Japanese Patent Application No. 2006-332015, frequencies could be found that allowed for stable operation up to 130 W by selecting a lower frequency than the rated operating frequency as the operating frequency during the dimming time (the "dimming frequency" as used herein) and then intermittently inserting a low frequency. However, the projected portion was deformed whatever frequency was selected when the power was brought further down.

FIG. 3 explains the deformation of the protruded portion. FIG. 3 schematically shows a portion of the light emitting tube of a high-pressure discharge lamp. The reference numerals 20 and A are electrodes and arcs formed between the electrodes 20, respectively.

In the case of operating a high-pressure discharge lamp with rated power, halogen is sealed inside the light emitting tube in order to suppress the blackening phenomenon of the light emitting tube, which is caused by tungsten, an electrode material that evaporates by heat at the time of operation and adheres to the wall of the light emitting tube. The evaporated tungsten reacts with the halogen and dissociates when it returns to the arc plasma by convection to become a cation. The tungsten cation is attracted to and accumulated in an area centering on the arc spot, which is the electric field concentration point of the tip end of the electrode in the cathode phase. Next, electrons impact on the entire portion of the tip end of the electrode when this electrode is inverted into the anode phase. As a result, the temperature of the electrode increases, and the tungsten accumulated in the cathode phase is evaporated again.

During the rated power operation time, the accumulation and evaporation are stably balanced to such a level that a proper protrusion can be maintained on the tip end of an electrode (FIG. 3(a)). However, the arc spot, which is the electric field concentration point on the tip end of the electrode, is restricted to the portion of the tip end of the protrusion during the dimming operation (i.e., when operated with power lower than the rated power) because the temperature of the tip end of the electrode becomes lower than the temperature during the rated power operation in the cathode phase state (FIG. 3 (b)). In other words, the protruded portion is divided into a point where the electric field particularly tends to be concentrated and a point that is not so. Since the arc spot has an extremely high temperature, tungsten is evaporated and the shape deformed even in the cathode phase if the concentration point is restricted to a narrow area (FIG. 3(c)). The temperature of the arc spot declines depending on the deformed shape, and the arc moves to a place where the arc spot tends to be formed (FIG. 3(d)). It is believed that the repetition of this phenomenon causes the protrusion to be deformed into a trapezoid and that the repetition of the arc jump is recognized as a flicker on the projection screen.

In order to avoid such a phenomenon, it is believed to be effective to increase the temperature on the tip end of the electrode by intermittently inserting a low frequency, and it is easily contemplated that the temperature of the electrode can be increased by increasing the number of waves to be inserted. It is assumed, however, that the temperature increment quantity is limited in the case of the alternating current drive because the anode phase where the temperature of the electrode increases and the cathode phase where it decreases always occur alternately. Moreover, in the event of lowering the frequency of a low frequency too far (e.g., about 10 Hz), the change in the current at the time of polarity inversion is visually recognized, leading to another flicker phenomenon in which the projected screen appears to be flickering.

Thus, the present inventors determined the cause of the flicker phenomenon that occurred when the dimming power was very low. As a result of intensively studying a method for solving the problem, they made a high-pressure discharge lamp according to the present invention.

In other words, the present invention relates to a high-pressure discharge lamp light source device having a high-pressure discharge lamp and a power supply device for operating the high-pressure discharge lamp by supplying rectangular wave alternating current, the high-pressure discharge lamp having a discharge vessel made of quartz glass having a pair of opposed electrodes, which are substantially equal in volume, wherein mercury of at least 0.2 mg/mm$^3$, halogen in the range of $10^{-6}$ μmol/mm$^3$ to $10^{-2}$ μmol/mm$^3$, and a prescribed amount of rare gas are sealed inside the high-pressure discharge lamp, wherein the power supply device is adapted to provide direct current of at most 0.5×P (W) with respect to the maximum operating power (W) during a steady operation state except for an initial operation period immediately after starting.

Although it is not absolutely clear why stable operation is possible by supplying direct current of at most 50% of the rated operation power, the following can be assumed. Since the temperature on the tip end of the electrode becomes low using extremely low power (at most 50%), the area in which hot electron emission occurs in the cathode phase becomes smaller than the area during the steady lighting operation. Hence, it is restricted to a very narrow spot.

In the alternating current drive operation, the anode phase and the cathode phase occur alternately. In this case, a different area may become the spot on each cathode phase. When a different area becomes the spot, the spot in the previous phase also has a low temperature, and in turn hardly becomes the spot in the following phase. As a result, the arc always moves around in the cathode phase looking for an area where the spot operation tends to occur. On the contrary, the abovementioned spot can be concentrated on one place in the direct current operation because the electrode on the side of the cathode operation is always fixed. Moreover, since the electric power is extremely low, the electric consumption is less and stable operation can be continued.

Besides, mercury of at least 0.2 mg/mm$^3$ is sealed in the high-pressure discharge lamp according to the present invention. In such a high-pressure discharge lamp, non-evaporated mercury, i.e., mercury that is not evaporated, remains at the power that is at most the power in the rated operation state even if no cooling is performed.

It is conventionally believed that non-evaporated mercury is not preferable because its concentration low not only in the action of narrowing down the discharge arc or the discharge starting point but also with respect to the optical output as a result of lowering the operating pressure. It is assumed, however, that the non-evaporated mercury contributes to playing a role of keeping a constant electrode temperature because it does not narrow down the discharge arc or the discharge starting point during operation with the power that is at most 50% of the rated operation power and, therefore, facilitates the hot electron emission for the electrode on the side of the cathode operation.

In the present invention, the abovementioned object can be achieved as follows:

(1) A high-pressure discharge lamp light source device having a high-pressure discharge lamp and a power supply device for operating the high-pressure discharge lamp by supplying rectangular wave alternating current, the high-pressure discharge lamp having a discharge vessel made of quartz glass having a pair of opposed electrodes of substantially equal volume, wherein mercury of at least 0.20 mg/mm$^3$, halogen in the range of $10^{-6}$ μmol/mm$^3$ to $10^{-2}$ μmol/mm$^3$, and a prescribed amount of rare gas are sealed inside the high-pressure discharge lamp, wherein the power supply device is adapted to supply direct current for operation with electric power of at most 0.5×P (W) with respect to the maximum operating power P (W) during a steady operation state except for an initial operation period immediately after starting.

(2) In the abovementioned (1), the polarity is inverted from one polarity to the other polarity during the direct current operation.

(3) In the abovementioned (1) and (2), the power supply device is adapted to switch to alternating current supply from the direct current supply when electric power higher than 0.5×P (W) is used for operation again after the operation with electric power of at most 0.5×P (W), and wherein the power supply device is adapted to gradually increase either or both of the power and frequency of the alternating current supply to the steady lighting operation.

(4) The high-pressure discharge lamp light source device in any one of the abovementioned (1) to (3) is mounted on a projector having the function of projecting images.

(5) In the projector according to the abovementioned (4), the mode is changed to the electric power mode of at most 0.5×P (W) if there is no change in an image signal of the projector for a certain period when the high-pressure discharge lamp is operated with the electric power higher than 0.5×P (W).

(6) In the projector according to the abovementioned (4), the high-pressure discharge lamp is automatically turned off if there is no change in an image signal of the projector for a certain period when the high-pressure discharge lamp is operated with the electric power of at most 0.5×P (W).

In the present invention, the following effects can be achieved.

(1) Since the direct current drive operation is used at the time of the standby power operation that uses an extremely low lamp operation power (at most 0.5×P (W) with respect to the maximum operating power P (W)), the arc bright spot of the discharge lamp can positionally be stabled, thereby preventing the occurrence of the so-called flickers.

(2) The inversion of polarity from one polarity to the other during the direct current drive operation enables the occurrence of any non-uniform thermal load on an electrode to be prevented, thereby securing the illumination lifespan characteristics even when operating with the standby power for a long period.

(3) By switching the power supply to an alternating current supply from the direct current supply when electric power higher than 0.5×P (W) is used for operation again after the operation with electric power of at most 0.5×P (W) and gradually increasing either or both of the power and frequency of the alternating current supply to the steady lighting operation, the thermal load on the electrode can further be lessened and the electrode temperature increased gradually, thereby preventing the occurrence of any damage to the tip end of the electrode arising out of thermal stress or the like.

(4) By mounting the high-pressure discharge lamp light source device according to the present invention on a projector and changing the mode to the electric power mode of at most 0.5×P (W), if there is no change in an image signal of the projector for a certain period when the high-pressure discharge lamp is operated with the electric power higher than 0.5×P (W), the consumption of any wasteful power can be prevented, thereby reducing the power to be used.

(5) By mounting the high-pressure discharge lamp light source device according to the present invention on a projector and automatically turning off its high-pressure discharge lamp, if there is no change in an image signal of the projector for a certain period when the high-pressure discharge lamp is operated with the electric power of at most 0.5×P (W), there is no possibility that a user may leave the projector turned on.

BRIEF DESCRIPTION OF DRAWINGS

FIGS. 10(a) & 10(b) are schematic views showing other examples of the waveform during the standby power operation mode.

DETAILED DESCRIPTION OF THE INVENTION

Figure 1:
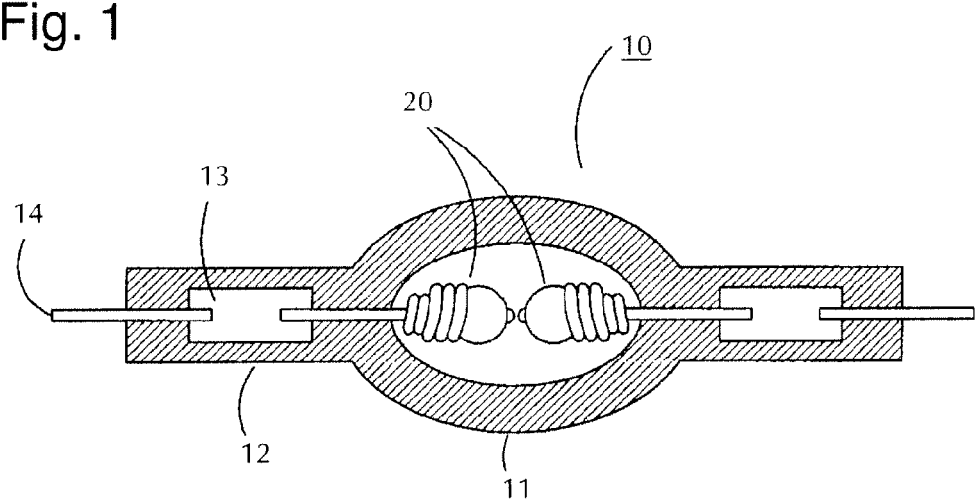
FIG. 1 is a schematic view showing a high-pressure discharge lamp for a high-pressure discharge lamp light source device according to the present invention.

FIG. 1 shows a high-pressure discharge lamp according to the present invention which has a substantially spherical light emitting part 11 formed of a discharge vessel made of quartz glass. Inside the light emitting part 11 is disposed a pair of opposed electrodes 20 with a distance of at most 2 mm between them. On opposite sides of the light emitting part 11 are formed sealing parts 12. In the sealing part 12, a conductive metal foil 13 made of molybdenum is air-tightly embedded using a shrink seal, for example. On one end of the metal foil 13 is bonded the axial part of an electrode 20. On the other end of the metal foil 13 is bonded an outer lead 14 through which power is supplied from an external power supply device.

Inside the light emitting part 11 are sealed mercury, rare gas, and halogen gas. Mercury is used for emitting light having a wavelength of visible light (e.g., 360 to 780 nm). The amount of mercury sealed is at least 0.20 mg/mm$^3$. The sealed amount varies depending on temperature conditions. An extremely high vapor pressure can be achieved of at least 200 atm during the lighting time. It is possible to make a discharge lamp having a high mercury vapor pressure such as at least 250 atm or at least 300 atm by sealing a larger amount of mercury. The more the mercury vapor pressure increases, the better a light source suitable for a projector device can be achieved.

As for the rare gas, argon gas of about 13 kPa is provided. It is used for improving the start-up of lighting. As for the halogen, iodine, bromine, chlorine or the like is used in the form of a compound with mercury or another metal. The amount of halogen sealed in the light emitting part 11 is in the range of $10^{-6}$ μmol/mm$^3$ to $10^{-2}$ μmol/mm$^3$. Halogen is used for prolonging the lifespan using the so-called halogen cycle. In addition, halogen used for an extremely small-sized high-pressure discharge lamp having a high operation vapor pressure, such as one according to the present invention, has the additional function of preventing devitrification of the discharge vessel.

This type of discharge lamp is contained within a projector device whose size has been reduced. Both the extreme reduction of the entire size and a high emission intensity are required. For this reason, the thermal influence is very severe inside the light emitting part. The load value on the wall of the lamp is in the range of 0.8 to 2.5 W/mm$^2$. Specifically, it is 2.4 W/mm$^2$.

Such a high mercury vapor pressure and load value on the lamp wall allow providing emitted light having a good color rendition when the discharge lamp is mounted on presentation equipment such as a projector device and an overhead projector.

Figure 2:
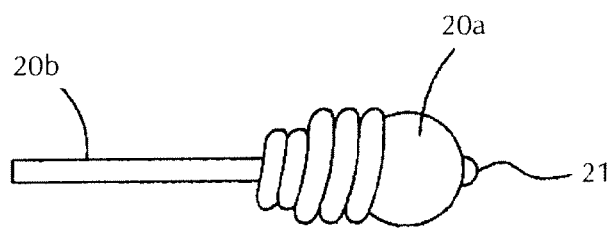
FIG. 2 is a schematic view showing an electrode of a high-pressure discharge lamp for a high-pressure discharge lamp light source device according to the present invention.
Figure 3:
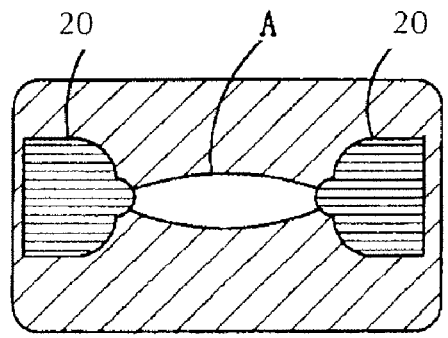
FIGS. 3(a)-3(d) are a schematic views showing the change in the electrode protrusion of a high-pressure discharge lamp.
Figure 3:
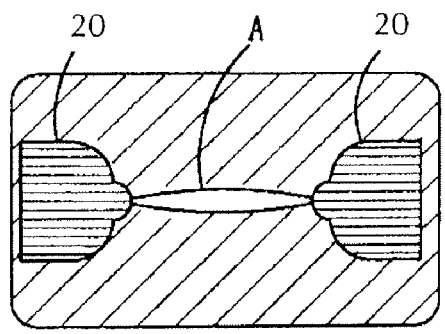
Figure 3:
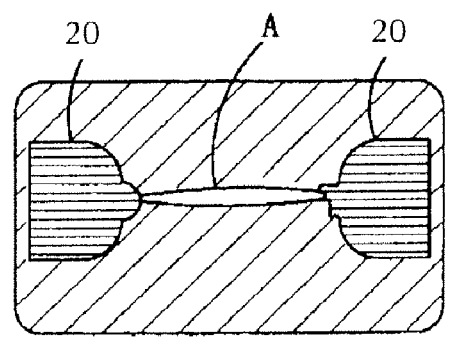
Figure 3:
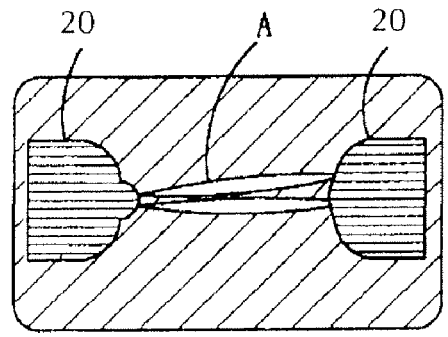

FIG. 2 schematically shows the tip end of the electrode 20 in FIG. 1 in order to show a protrusion on the tip end of the electrode. The electrode 20 has a bulb part 20a and an axial part 20b, and a protrusion 21 is formed on the tip end of the bulb part 20a.

The abovementioned protrusion 21 is indispensable for a discharge lamp like one according to the present invention that is used as a light source for a projector device, wherein the distance between the electrodes is at most 2 mm and wherein mercury of at least 0.2 mg/mm$^3$ is contained in the light emitting part. This is because arc discharge is narrowed down to a small area by the high vapor pressure, and therefore, the discharge starting point is also narrowed down to a small area in a discharge lamp that contains mercury of not less than 0.2 mg/mm$^3$ in the light emitting part and reaches an operation pressure of not less than 200 atm.

Since the protrusion 21 is formed on the tip end of the electrode and arc discharge occurs there as a starting point, light emitted from the arc is not blocked by the bulb part 20a. The advantage is that the efficiency of using light increases, resulting in brighter images. Although FIG. 2 is a schematic view, the tip end of the axial part 20b usually has an element corresponding to the bulb part having a diameter larger than the axial diameter.

Figure 4:
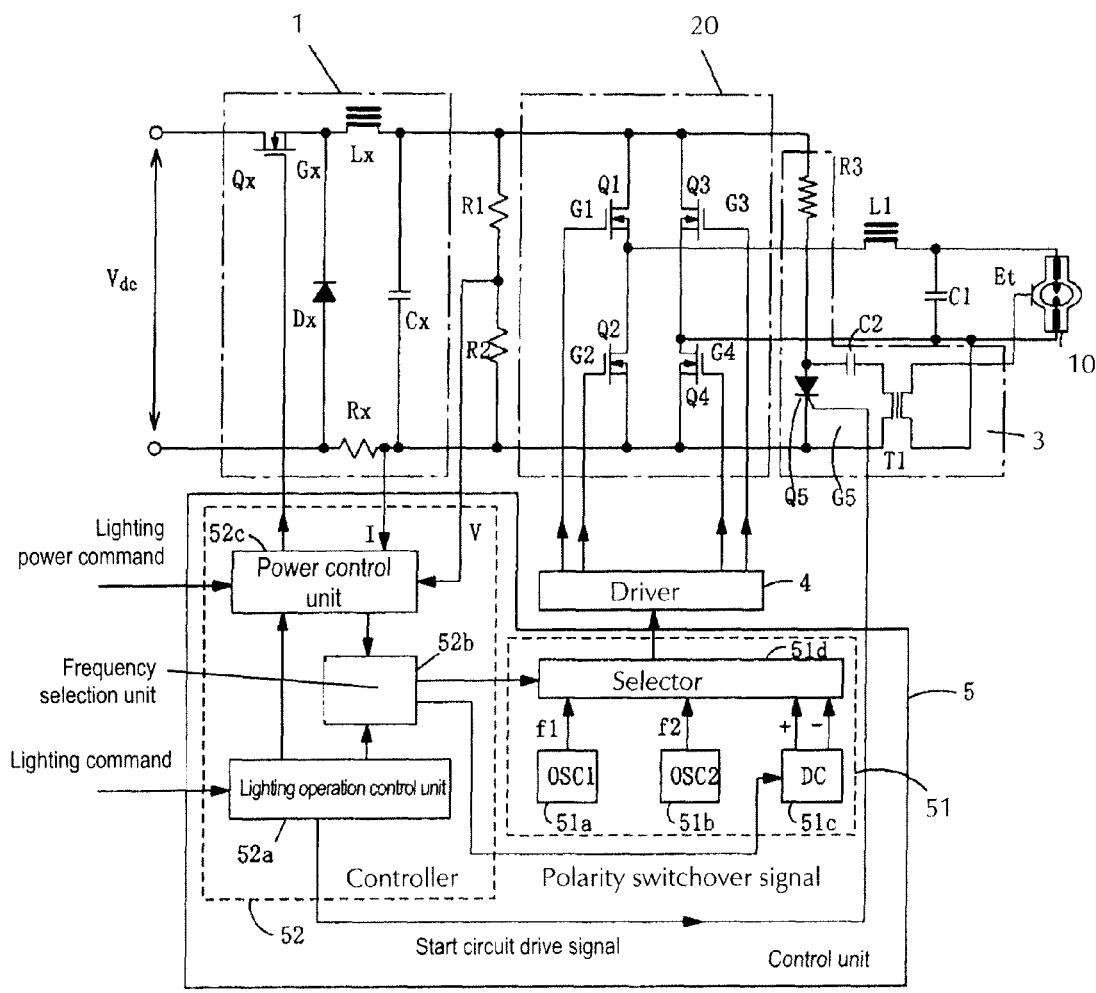
FIG. 4 is a schematic view showing the configuration of a high-pressure discharge lamp light source device according to an embodiment of the present invention.

Next, FIG. 4 illustrates the configuration of a high-pressure discharge lamp light source device for operating the abovementioned discharge lamp.

The light source device is constituted of a power supply device for supplying power to a discharge lamp 10. More specifically, it is comprised of a step-down chopper circuit 1 for supplying DC voltage, a full bridge type inverter circuit 2 that is connected on the output side of the step-down chopper circuit 1, changes DC voltage to alternating voltage and supplies it to the discharge lamp 10 (also referred to as "a full bridge circuit" as used herein), a coil L1 connected to the discharge lamp 10 in series, a capacitor C1 connected in parallel, a starter circuit 3, a driver 4 for driving switching elements Q1-Q4 of the abovementioned full bridge circuit 2 and a control unit 5 having a processing unit such as a microprocessor. FIG. 4 shows its functional composition with a block diagram.

In FIG. 4, the step-down chopper circuit 1 is comprised of a switching element Qx and an inductor Lx, both of which are connected to the positive side power source terminal to which DC voltage is supplied, a diode Dx whose cathode side is connected in between the connection point of the switching element Qx and the inductor Lx and the negative side power source terminal, a smoothing capacitor connected to the output side of the inductor Lx, and a resistance Rx for detecting current, which is connected in between the minus side terminal of the smoothing capacitor Cx and the anode side of the diode Dx.

By driving the abovementioned switching element Qx with a prescribed duty, input DC voltage $V_{dc}$ is stepped down to the voltage corresponding to this duty. On the output side of the step-down chopper circuit 1 is provided a series circuit of resistance R1 and R2 for detecting voltage.

The full bridge circuit 2 is constituted of switching elements Q1-Q4, which are connected to each other in a bridge form. By turning the switching elements Q1, Q4 and the switching elements Q2, Q3 alternately, DC voltage having a rectangular waveform is generated between the connection point of the switching elements Q1, Q2 and the connection point of the switching elements Q3, Q4.

With the switching element Q5 turned on, an electric charge in the capacitor C2 is discharged via the switching element Q5 and the winding on the primary side of a transformer T1. As a result, pulsed high voltage is generated on the secondary side of the transformer T1. This high voltage is applied to an auxiliary electrode Et of the discharge lamp 10 to light the lamp.

In the abovementioned circuit, the DC (direct current) operation can be achieved by adjusting the switching cycle of the switching elements Q1-Q4 in the full bridge circuit 2. The output voltage can be achieved by adjusting the operating duty of the switching element Qx in the step-down chopper circuit 1. The switching element Qx in the step-down chopper circuit 1 is turned on or off in accordance with the duty of a gate signal Gx, whereby the power to be supplied to the lamp 10 changes. In other words, the duty of Qx is decreased if the power should be increased, for example. Thus, the gate signal Gx is controlled in such a way that the power value agrees with an inputted power adjustment signal value.

The control unit 5 is comprised of a drive signal generating means 51 and a controller 52. The drive signal generating means 51 is comprised of alternating current signal generators 51a-51b, a direct current signal generator 51c, and a selector 51d for selecting outputs thereof and generating a drive signal for driving the switching elements Q1-Q4 in the full bridge circuit 2.

The controller 52 is provided with a lighting operation control unit 52a for controlling the lighting operation of the lamp 10 and a power control unit 52c for controlling lamp power by driving the switching element Qx in the step-down chopper circuit 1 with a preset duty in accordance with a lighting power command signal from the outside. In addition, it is also provided with a frequency selecting unit 52b for transmitting a frequency selecting command to the selector in the abovementioned drive signal generating means 51 depending on whether it is the steady operation or the standby power operation for the operation with power of at most 0.5×P (W) in order to set up drive signals of the abovementioned switching elements Q1-Q4.

The power control unit 52c calculates the lamp power by finding lamp current I and lamp voltage V based on the voltage between both ends of the resistance Rx for detecting current and voltage detected by the resistances R1 and R2 for detecting voltage and controls the duty of the switching element Qx in the step-down chopper circuit 1 in such a way that the abovementioned lamp power agrees with a power value in accordance with the lighting power command. In addition, it also transmits a frequency/direct current selecting signal to the frequency selecting unit 52b depending on whether it is the steady operation or the standby power operation. The selector 51d selectively transmits the outputs of the alternating current signal generators 51a-51b and the direct current signal generator 51c to the driver 4 in accordance with a command from the frequency selecting unit 52b.

As an example, during the steady operation, the outputs of the alternating current signal generator 51a for outputting a steady operation frequency and the alternating current signal generator 51b for outputting a low frequency are alternately selected. As a result, a signal having the waveform in FIG. 7 as described below is outputted, for example. In the case of the standby power operation, the output of the direct current signal generator 51d is selected. As a result, a signal having the waveform in FIG. 8 as described below is output, for example.

Besides, the polarity of the direct current signal outputted from the direct current signal generator 51d may be switched in accordance with a polarity switchover signal outputted from the frequency selecting unit 52b. Moreover, in the event that the standby power operation is changed to the steady operation by gradually increasing the operating power or gradually lessening the anode operating period of the electrode on the side of the anode operation, the polarity of the direct current is controlled by gradually increasing the power supplied to the lamp at the power control unit 52c or using a polarity switchover signal transmitted to the direct current signal generator 51d, as described below.

Figure 5:
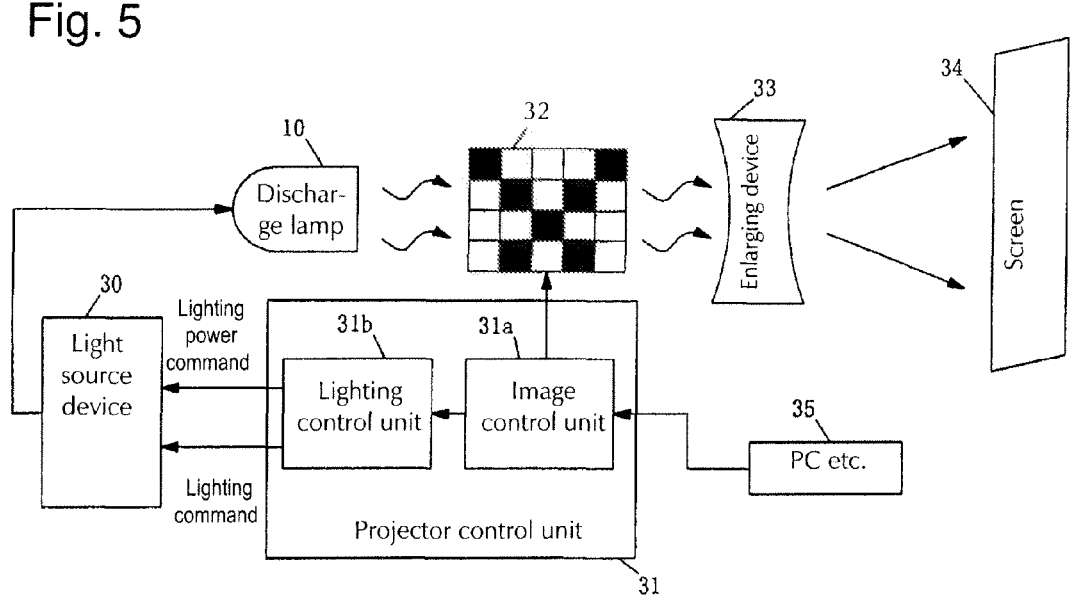
FIG. 5 is a schematic view showing the configuration of a projector on which a high-pressure discharge lamp light source device according to an embodiment of the present invention is mounted.

FIG. 5 shows one example of the configuration of a projector on which a high pressure discharge lamp light source device according to the present invention is mounted.

The projector is comprised of the abovementioned high-pressure discharge lamp light source device 30 and high-pressure discharge lamp 10, a projector control unit 31, an image display device 32 constituted of a liquid crystal display device and the like, an enlarging device 33 for performing an enlarged display of images displayed on the image display device 32. The images enlarged by the enlarging device 33 are projected on a screen 34 for display.

The projector control unit 31 is provided with an image control unit 31a for processing an image signal transmitted from an external device such as a personal computer 35 or a television and a lighting control unit 31b for transmitting a lighting command and a lighting power command to the abovementioned high-pressure discharge lamp light source device 30.

Figure 6:
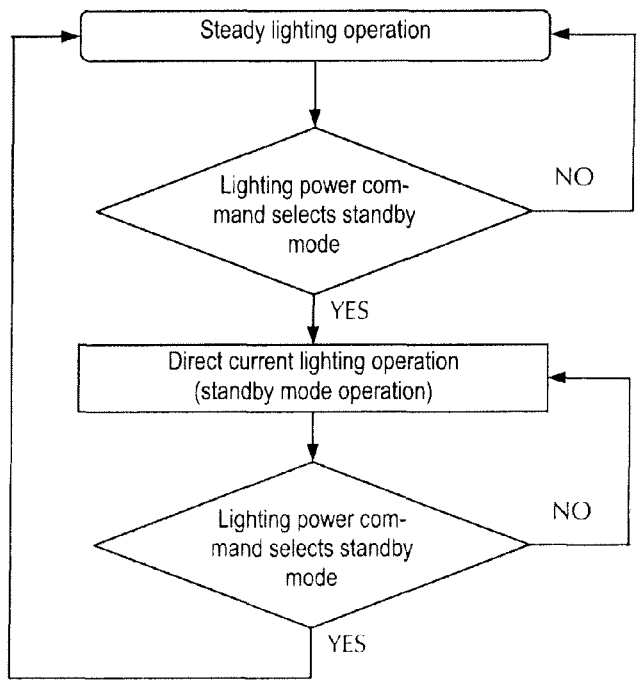
FIG. 6 is a flow diagram showing one example of the processing at the time of the switching control to a standby power operation mode.

Next, a description of the switchover control from the steady lighting operation mode to the standby power operation mode according to the present invention is given below. FIG. 6 is a flow diagram showing one example of the switchover processing conducted by the control unit 5 as shown in FIG. 4. As used herein, the term "steady operation mode" refers to the case in which the operation is carried out with "rated power" or "dimmed power," as described above. Although the operation power of the "dimmed power" varies depending on the design of the high pressure discharge lamp and the power supply device, the "dimmed power" usually refers to the operation with power that is about 60 to 80% with respect to the "rated power."

In FIG. 6, when the standby power mode is selected by a lighting power command signal transmitted to the control unit 5, the control unit 5, as shown in FIG. 4, selects the direct current operation drive. In other words, the frequency selecting unit 52 has the selector 51d select the output of the direct current signal generator 51d, and the driver 4 transmits a direct current drive signal to the switching elements Q1-Q4, keeps the switching elements Q1 and Q4 or Q3 and Q2 turned on and drives the high-pressure discharge lamp 10 with direct current.

On the other hand, when the steady operation mode is selected by a lighting power command signal, the rectangular wave alternating current operation is carried out. In other words, the frequency selecting unit 52 has the selector 51d select the output of the alternating current signal generators 51a, 51b, and the driver 4 transmits an alternating current drive signal to the switching elements Q1-Q4, keeps the switching elements Q1, Q4 or Q3, Q2 alternately on and supplies AC rectangular wave current to the high-pressure discharge lamp 10.

Figure 7:
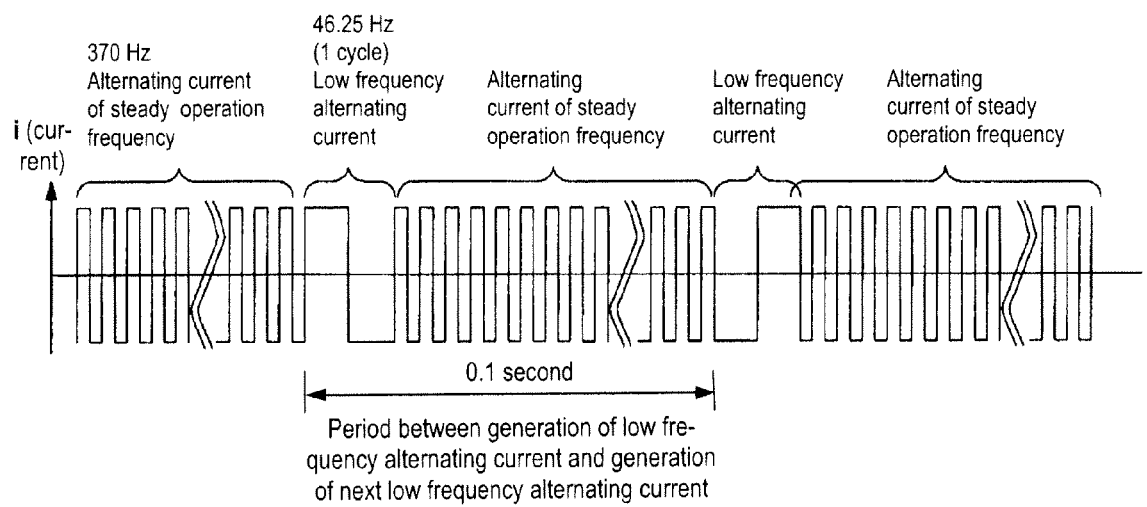
FIG. 7 is a schematic view showing one example of the current waveform of a discharge lamp during the steady lighting operation.

FIG. 7 shows one example of current waveforms in the discharge lamp 10 during the steady lighting operation. The Y-axis shows current values and the X-axis time.

The power supply device in FIG. 4 works in the following steps and supplies current having a pattern as shown in FIG. 7 to the lamp during the steady operation time.

(1) After a lighting command is given, power is supplied to the lamp 10. The lighting operation control unit 52a in the controller 52 generates a start circuit drive signal and triggers the starter circuit 3 to light the lamp 10.

(2) Upon the lamp 10 being lit, operation power is calculated at the power control unit 52c based on a voltage value V detected by the divided resistance elements R1, R2 and a current value I detected by the resistance Rx.

(3) The power control unit 52c in the controller 52 controls operation power by controlling the switching element Qx in the step-down chopper circuit 1 based on a lighting power command signal and a power value calculated above.

(4) During the steady operation time, the frequency selecting unit 52b in the controller 52 has the selector 51d in the drive signal generating means 51 select the output of the alternating current signal generator 51a and the output of the alternating current signal generator 51b and alternately outputs a steady operation frequency signal f1 and a low frequency signal f2 from the selector 51d.

The output from the selector 51d is transmitted to the switching elements Q1-Q4 in the full bridge circuit 2 via the driver 4. The switching elements Q1-Q4 are driven by a steady operation frequency signal f1 (60-1000 Hz) during the abovementioned steady operation time. After each first prescribed time (0.01 seconds to 120 seconds), however, they are driven by a low frequency signal f2 (5 to 200 Hz), which is a lower frequency than the steady operation frequency, for a second prescribed time (a period of a half cycle to five cycles of the low frequency signal) (see, the waveform during the steady operation time in FIG. 7).

Figure 8:
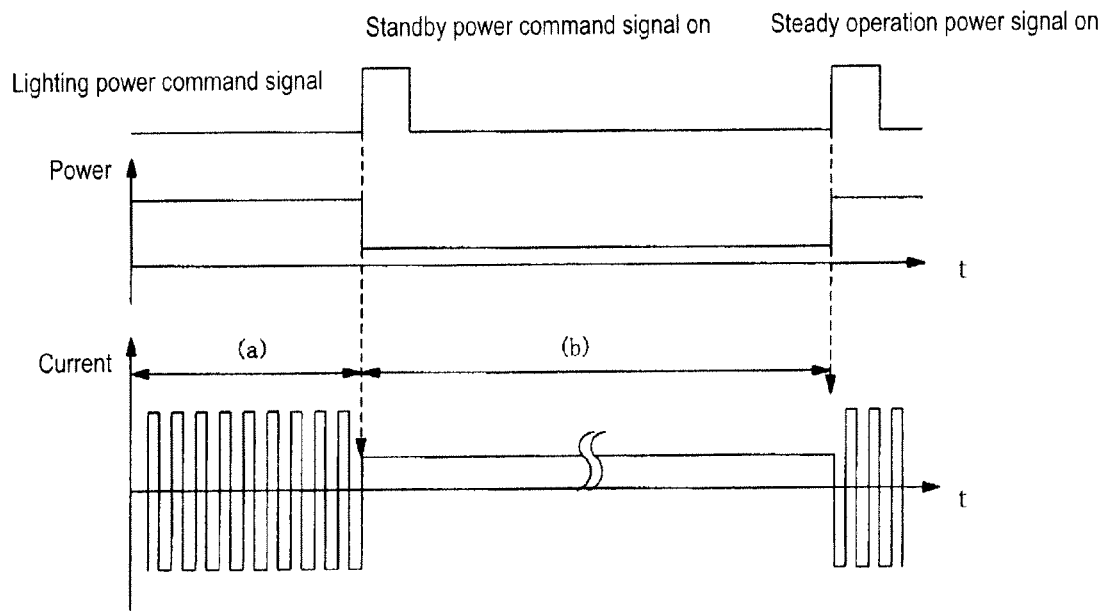
FIG. 8 is a schematic view showing one example of the lighting power command signal and electric power/current waveforms when the mode is switched to the standby power operation from the steady lighting operation.

FIG. 8 shows one example of a lighting power command signal and a power/current waveform at a time when the mode is switched to the standby power operation from the steady lighting operation. The Y-axis shows a signal level, a current value and a voltage value and the X-axis time. During the steady lighting operation time, a frequency selected from the range of 60 to 1000 Hz is a steady operation frequency, and alternating current having this frequency is supplied to the high-pressure discharge lamp as described above.

Upon detecting a standby power operation signal, the control unit 5 selects the direct current operation drive for operation with DC current, as described above. During the standby power lighting time, a high-pressure discharge lamp is operated with DC current that is 25% of the rated current.

Table 1 shows one specific example of a waveform during the steady operation time and the standby power operation time. The (a) and (b) in Table 1 correspond to the waveforms in the sections (a) and (b) in FIG. 8, respectively

TABLE 1

| Waveform (a) during the steady operation time | |
|---|---|
| Rated power | 180 W, 90 V, 2.0 A |
| Steady operation frequency | 370 Hz |
| Waveform (b) during the standby operation time | |
| Power | 45 W, 45.6 V, 0.99 A |

Figure 9:
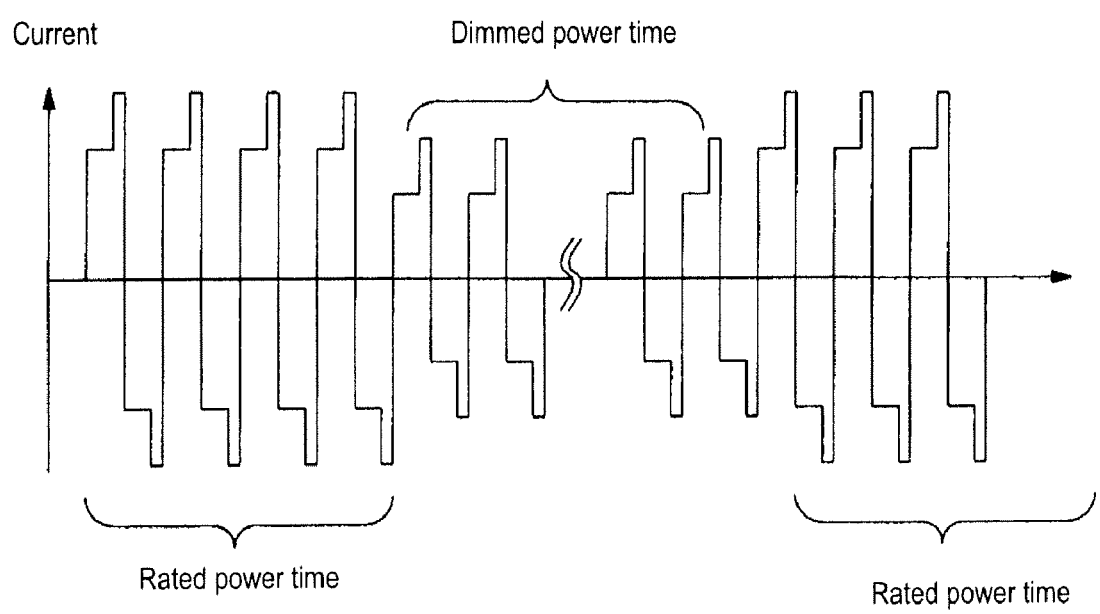
FIG. 9 is a schematic view showing one example of the waveform formed by superimposing a pulse on an alternating current waveform during the steady lighting operation.

A simple rectangular wave was used above as alternating current during the steady operation time. However, it is only illustrative. The waveform is not limited to this drive waveform. For example, the waveform may be formed by combining a frequency selected from the range of 5 Hz to 200 Hz, which is lower than the abovementioned steady operation frequency, with a low frequency. As shown in FIG. 9, it may be a waveform formed by superimposing pulses.

Experiments were conducted to find the range of direct current power values during the standby power operation in the present invention. Table 2 shows the results.

Table 2 shows the presence or absence of lighting, electrode wear and flicker for each power value using a lamp with a rated operation power of 180 W, wherein the direct current operation power value of the present invention is changed in the range of 10 W to 140 W.

TABLE 2

| Operation power | Steady operation power ratio | Lighting | Wear of electrode | Flicker | Judgment |
|---|---|---|---|---|---|
| 10 W | 6% | X | — | — | NG |
| 20 W | 11% | ○ | ○ | No | OK |
| 30 W | 17% | ○ | ○ | No | OK |
| 36 W | 20% | ○ | ○ | No | OK |
| 40 W | 22% | ○ | ○ | No | OK |
| 50 W | 28% | ○ | ○ | No | OK |
| 60 W | 33% | ○ | ○ | No | OK |
| 70 W | 39% | ○ | ○ | No | OK |
| 80 W | 44% | ○ | ○ | No | OK |
| 90 W | 50% | ○ | ○ | No | OK |
| 100 W | 56% | ○ | X | No | NG |
| 110 W | 61% | ○ | X | No | NG |
| 120 W | 67% | ○ | X | Yes | NG |

TABLE 2-continued

| Operation power | Steady operation power ratio | Lighting | Wear of electrode | Flicker | Judgment |
|---|---|---|---|---|---|
| 130 W | 72% | ○ | X | Yes | NG |
| 140 W | 78% | ○ | X | Yes | NG |

As shown in Table 2, the operation could not be maintained with power lower than 11% of the rated power. It is assumed that the discharge could not be maintained because the temperature of the electrode on the side of the cathode operation became so low that a sufficient amount of hot electrons could not be emitted from the cathode.

The protrusion disappeared with power higher than 50% of the rated power because the temperature of the electrode on the side of the anode operation became too high. For this reason, the conclusion was drawn that an excellent lighting state can be achieved only when operated with direct current operation power in the range of 11 to 50% of the rated power, wherein there occurred neither flicker nor the disappearance of the protrusion on the tip end of the electrode.

A lamp of 180 W in rated operation was described above. However, the rated power value is not limited to 180 W. The present invention can be applied to other lamps in a similar manner as well. In this case, although it depends on the design of the lamp, it was found that the flicker phenomenon occurred due to the disappearance of the protrusion, as described above, when direct current operation was carried out with a power higher than 50% of the rated power even if the electrode was designed in such a way that it was large enough to withstand the rated power.

It was also found that the direct current operation can stably be conducted up to about 20 W yet it was not possible to maintain discharge with 10 W even if the lamp has a different design.

Next, the presence or absence of lighting, electrode wear and flicker were examined for each power value using a lamp with a rated operation power of 180 W based on the conventional drive method (i.e., the alternating current drive), wherein power values were changed in the range of 70 W to 140 W. Table 3 shows the results.

As shown in Table 3, below, the arc spot was unstable, the electrode worn away and flicker observed with an operation power of at least 120 W because the temperature was low on the surface of the tip end of the electrode.

TABLE 3

| Operation power | Steady operation power ratio | Lighting | Friction of electrode | Flicker | Judgment |
|---|---|---|---|---|---|
| 70 W | 39% | ○ | X | Yes | NG |
| 80 W | 44% | ○ | X | Yes | NG |
| 90 W | 50% | ○ | X | Yes | NG |
| 100 W | 56% | ○ | X | Yes | NG |
| 110 W | 61% | ○ | X | Yes | NG |
| 120 W | 67% | ○ | X | Yes | NG |
| 130 W | 72% | ○ | ○ | No | OK |
| 140 W | 78% | ○ | ○ | No | OK |

FIGS. 10(a) & 10(b) show other examples of waveforms in the standby power operation mode. These figures show one example of operation power command signals and power/current waveforms. The Y-axis shows the signal level, current value and power value and the X-axis time.

FIG. 10(a) shows the direct current drive in accordance with the standby power command signal and one example of waveforms, wherein the cathode operation and the anode operation are inversed after a prescribed period.

In the case that a high-pressure discharge lamp originally used for the steady operation by the alternating current drive is operated with direct current, the disappearance of the protrusion may occur if the input is high, as described above.

It is not that there is no wear at all if the power is at most 50% of the rated power. The amount of wear is minimal. There may not occur any problem during the standby power operation if it is for a relatively short period (e.g., about one hour). However, it can be contemplated that even a small amount of wear may cause a problem in the case of using a lamp in the projection mode in which images are projected onto a screen in order to satisfy the illumination maintenance rate, which exceeds 5000 hours, for example. Particularly, in the case of the direct current operation, it can easily be contemplated that the amount of wear may significantly influence the illumination characteristics because there is no process for creating a protrusion, as described in Japanese Patent Application No. 2006-332015. In order to avoid this problem, the polarity may be inversed in the course of the direct current drive (FIG. 10(a)) or the polarity of the direct current drive may be inversed after each change in the operation mode (FIG. 10(b)). As a result, it is possible to avoid any occurrence of non-uniform thermal load on an electrode, thereby securing the illumination lifespan characteristics with a power of at most 50%.

By the way, during the standby power operation time, direct current needs to be supplied to the lamp. A direct current drive signal needs to be transmitted to the switching elements Q1-Q4 in the full bridge circuit 2 as shown in FIG. 4 and keep the switching elements Q1, Q4 or Q3, Q2 turned on. Accordingly, it is necessary to continuously give a high-level signal to the gates G1, G4 of the switching elements Q1, Q4 or the gates G3, G2 of the switching elements Q3, Q2. Therefore, it is necessary to apply a higher level of voltage to the gate drive signal for the switching elements Q1, Q3 than the gate drive signal for the switching elements Q2, Q4. A high-level drive signal to be supplied to the gates G1, G3 of the switching elements Q1, Q3 may be created using a separate power source or a charge pump circuit. However, such a method may increase the number of parts as well as costs. Accordingly, a high-level gate drive signal to be supplied to the charge pump circuit Q1, Q2 is created by charging the capacitor, for example, in the actual circuit configuration. In this case, since the abovementioned capacitor is discharged, it is difficult to maintain the switching elements Q1, Q3 turned on for a long period; therefore, this capacitor needs to be charged periodically. In the case of using a drive circuit with such a capacitor, the switching elements Q1, Q3 are temporarily turned off while the capacitor is charged, resulting in the periodic polarity inversion operation as shown in FIGS. 11 & 12.

Figure 11:
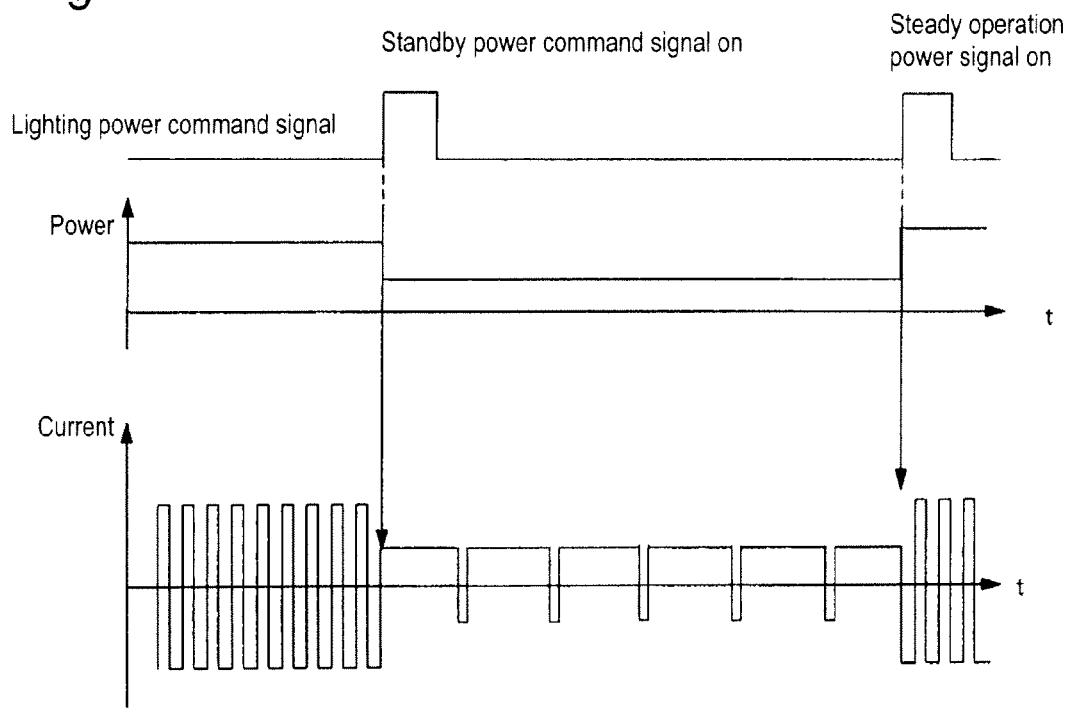
FIG. 11 is a schematic view (1) showing one example of the waveform in the standby power operation mode when the polarity inversion operation is carried out periodically.
Figure 12:
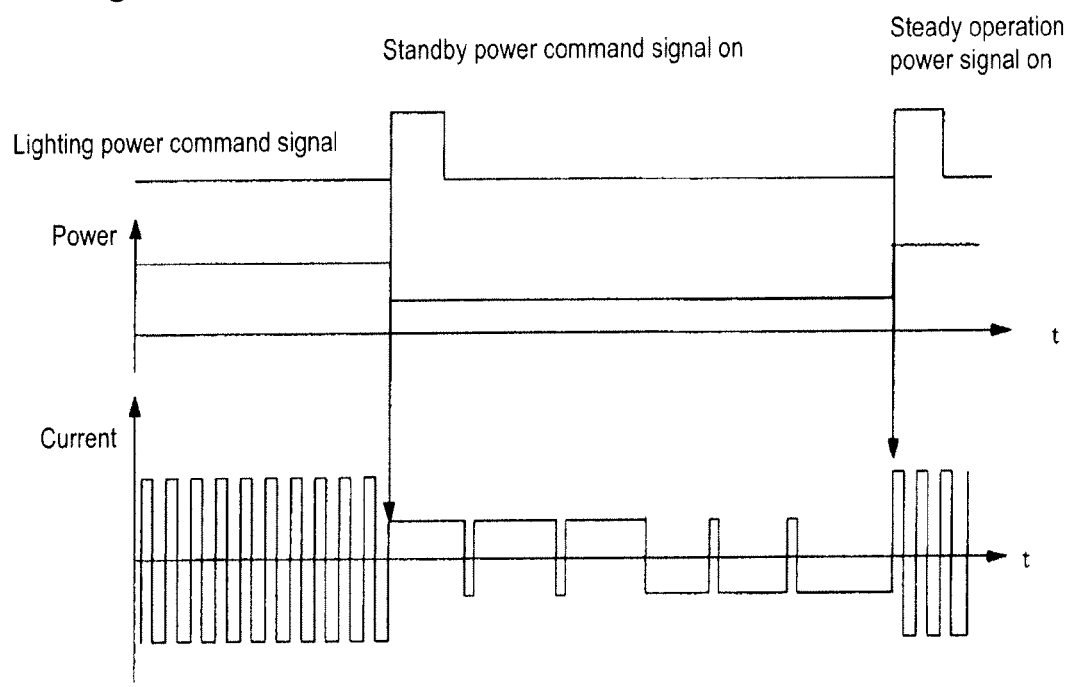
FIG. 12 is a schematic view (2) showing one example of the waveform in the standby power operation mode when the polarity inversion operation is carried out periodically.

FIGS. 11 & 12 show examples of waveforms in the standby power operation mode during the periodic polarity inversion operation as described above. The drawings show examples of operation power command signals and power/current waveforms. FIG. 11 shows an example of waveforms when there is no polarity inversion during the direct current drive. FIG. 12 shows an example of waveforms when there is a polarity inversion during the direct current drive. The Y-axis shows the signal level, current value and power value and the X-axis time.

It was confirmed that the same effect as in the direct current drive operation could be achieved even when the inversion operation lasts 1 ms for each 70 ms, for example, as shown in FIG. 11. Furthermore, it was also confirmed that the same effect could be achieved with the same waveform as that in FIG. 10(a), as shown in FIG. 12, with no influence on the illumination lifespan characteristics.

Next, the mode changes were considered from the operation power that is at most 50% of the steady operation, such as the standby power operation to the steady operation. In this case, it is desirable to operate in the steady operation mode after supplying alternating current for a prescribed period. This is because mercury must be evaporated before the mode is changed into the steady operation power mode; a fixed period is required before reaching a fixed voltage operation; and as it can easily be contemplated, the protrusion may disappear on the electrode on the side of the anode operation, as described above, if the direct current lighting operation is carried out during this period. In this respect, it is desirable that the operating power should gradually be increased and the mode also changed gradually into the alternating current drive operation (FIG. 10). Furthermore, the electrode temperature can gradually be increased without suddenly giving a thermal load by increasing the operating power after the mode is changed to the alternating current drive operation, i.e., by having the electrode on the side of the cathode or anode operation experience the opposite polarity by carrying out the alternating current drive operation with relatively low power, thereby preventing the occurrence of a crack on the tip end of the electrode arising out of thermal stress.

In general, the electrodes used for a high-pressure discharge lamp are mainly made of tungsten. Tungsten having an extremely high purity of not less than 99.999% is used in order to improve the illumination lifespan characteristics. The advantage of highly pure tungsten is that a long lifespan can be expected because little impurities are contained. On the other hand, the disadvantage is that highly pure tungsten is brittle because the crystal size is large. Particularly, the crystal size tends to become large on the tip portion because it is extremely hot. There may occur a failure, such as a crack on the crystalline interface, which is caused by the thermal stress added suddenly. Accordingly, it is desirable to change power only after changing into the alternating current drive at a time when the mode is changed into the steady operation.

From this viewpoint, the frequency should not necessarily be the same as the alternating current operation frequency for the rated operation in the case of changing the mode into the steady operation. Instead, the abovementioned thermal load can be reduced as much as possible by changing frequency as the power is changed.

Figure 13:
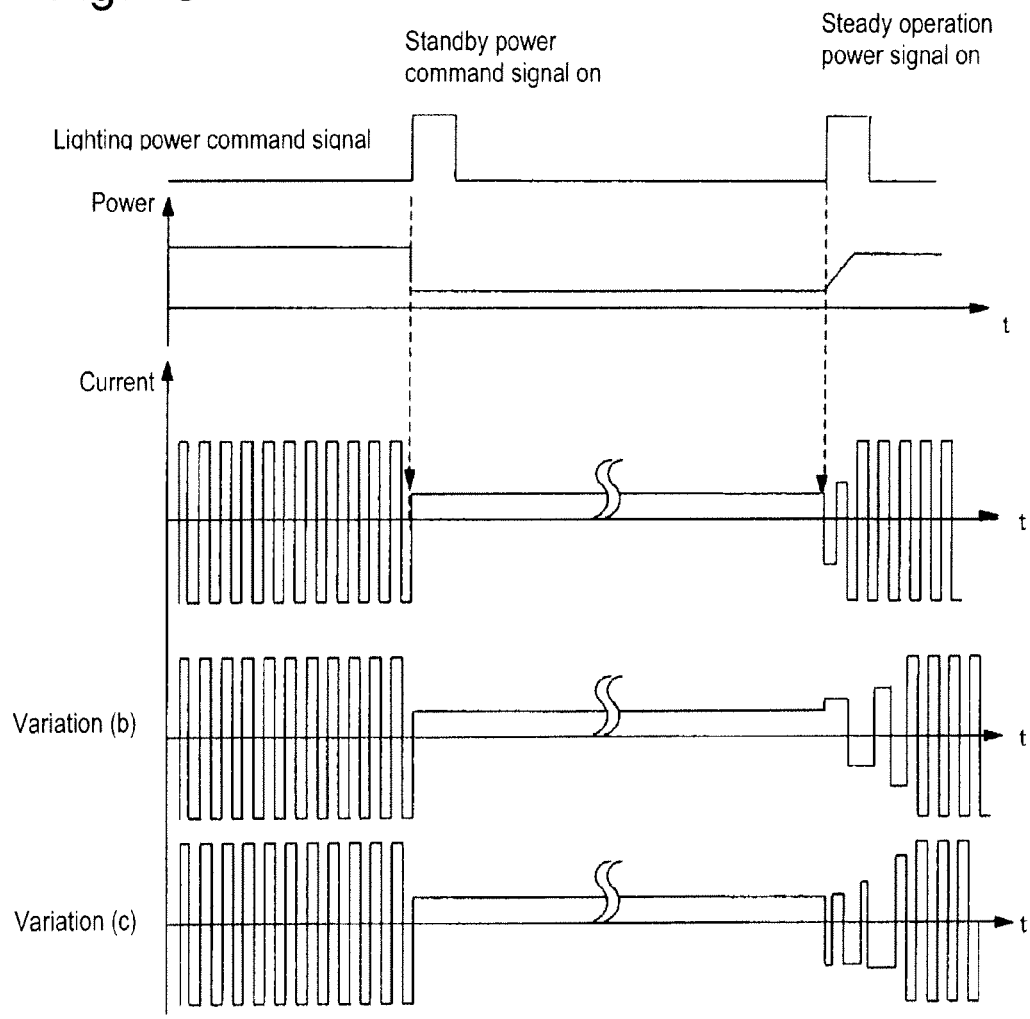
FIG. 13 is a schematic view showing some waveforms used for lessening the thermal load at a time when the mode is changed into the steady lighting operation from the standby power operation.

FIG. 13 is a view showing examples of waveforms capable of lessening the thermal load at a time when the mode is changed to the steady operation from the standby power operation. The Y-axis shows the signal level, current value and voltage value and the X-axis time.

As shown in FIG. 13, the operation power is gradually changed to the steady operation at a time when the mode is changed to the steady operation from the standby power operation. As shown in FIG. 13(a), the mode is changed to the steady lighting operation by gradually increasing the alternating current value.

Alternatively, as shown in FIG. 13(b), the mode is changed to the steady operation by gradually increasing the frequency and alternating current. FIG. 13(c) shows a variation in which the mode is changed to steady operation by changing the duration between the cathode operation and the anode operation so that the difference in temperature between the electrode on the cathode operation side and the electrode on the anode operation side can be reduced.

Next, the following explains an example of the control operation when a high pressure discharge lamp according to the present embodiment is mounted on a projector as shown in FIG. 5.

Figure 14:
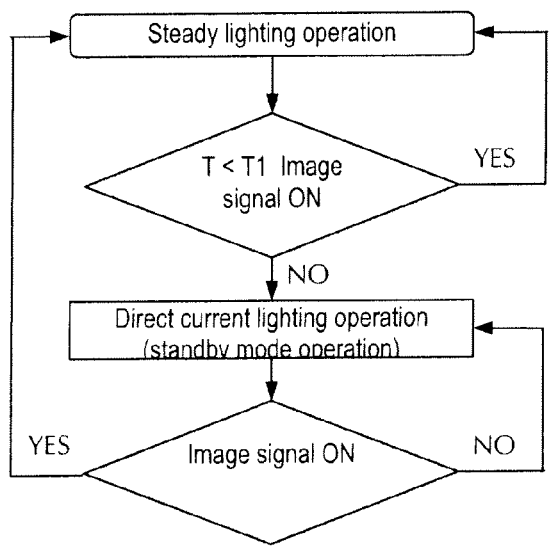
FIG. 14 is a flow diagram showing the operation in an embodiment in which the mode is changed to the standby power operation mode when there is no change in an image signal for more than a prescribed period.
Figure 15:
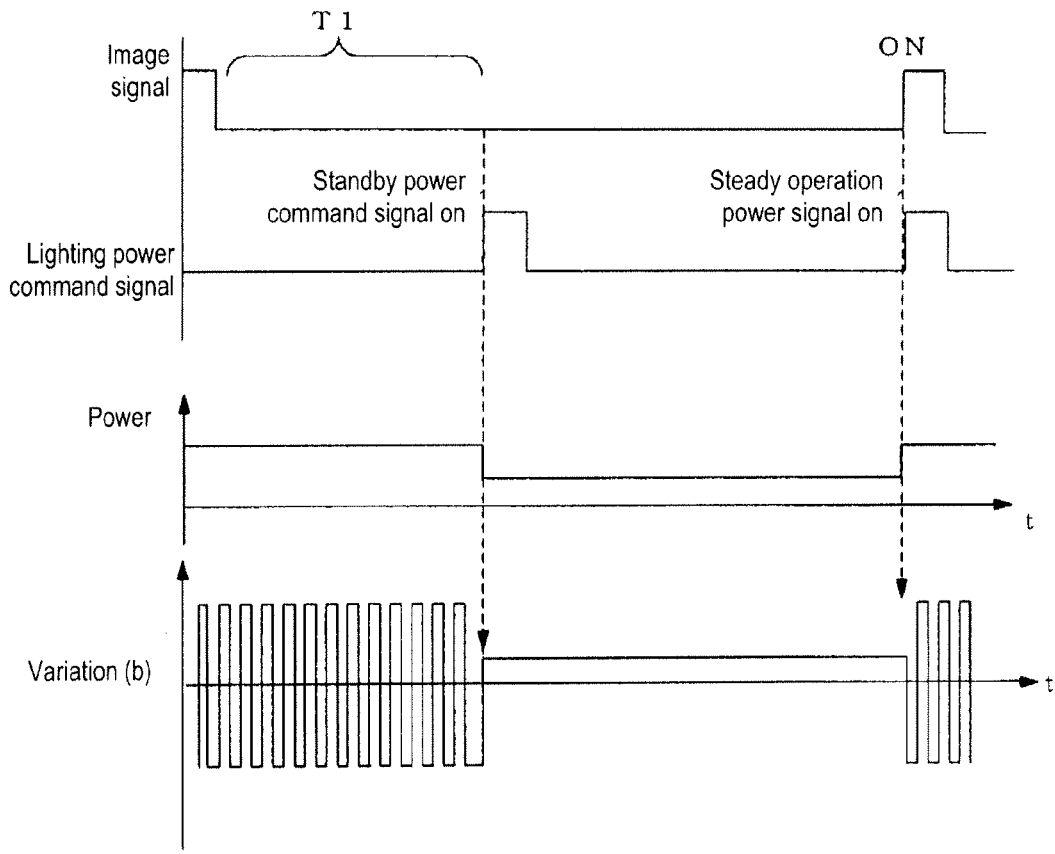
FIG. 15 is a time chart for the lighting power command signal, electric power and current in an embodiment in which the mode is changed to the standby power operation mode when there is no change in an image signal for more than a prescribed period.

FIG. 14 is a flow diagram showing a case in which there is no change in the image signal for a period longer than a fixed period T1 that is preset in the image control unit. FIG. 15 shows a time chart for the operation power command signal, power and current. In FIGS. 14 & 15, when there is no change in the image signal for a period longer than a fixed period T1 during the steady operation, a signal for selecting the standby power operation mode is transmitted from the lighting control unit 31b in the projector control unit 31, and the light source device 30 is changed to the standby power operation mode based on the signal. When the image signal is turned on, the mode is changed again to the steady operation mode from the standby power operation mode.

The abovementioned control allows automatic changing of the mode to the standby power operation mode when there is no change on the screen for a fixed period in the state where an image is projected onto the screen from a projector via an external signal, such as a personal computer, thereby reducing the consumption of electric power.

Moreover, the consumption of electric power can further be reduced by stopping the cooling of the high pressure discharge lamp in addition to the change of the mode to the standby power operation mode. When a high-pressure discharge lamp is used repeatedly for short operation periods, the lifespan of the high-pressure discharge lamp may be adversely influenced due to damage at the time of startup. The use of the standby power operation mode enables a continuous lighting operation to be maintained without turning off the high-pressure discharge lamp. As a result, the advantage is that the lifespan characteristics can be substantially improved and that an image can be projected on the screen instantaneously.

Figure 16:
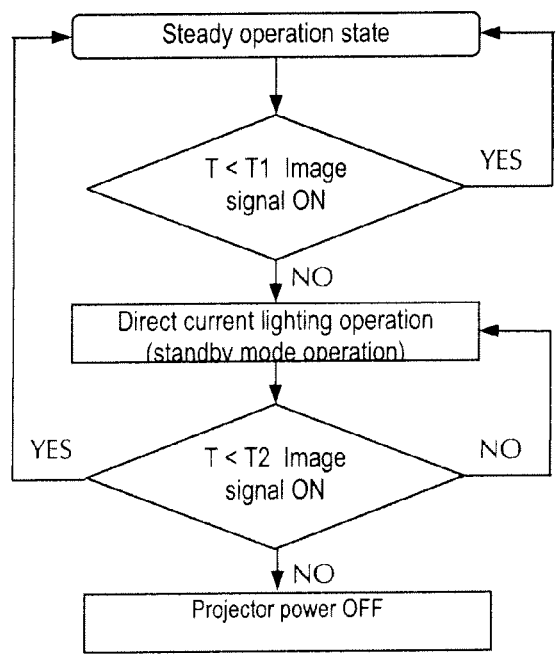
FIG. 16 is a flow diagram showing the operation in an embodiment in which a lamp is turned off when the standby power operation mode continues for more than a prescribed period.
Figure 17:
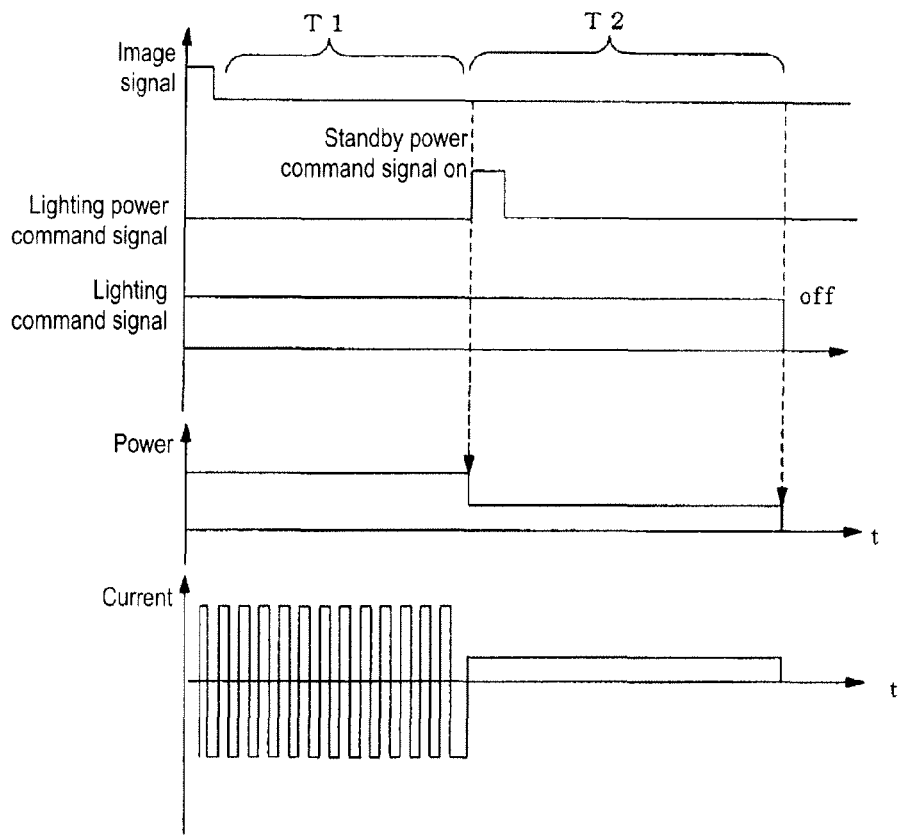
FIG. 17 is a time chart for the lighting power command signal, electric power and current in an embodiment in which a lamp is turned off when the standby power operation mode continues for more than a prescribed period.
Figure 18:
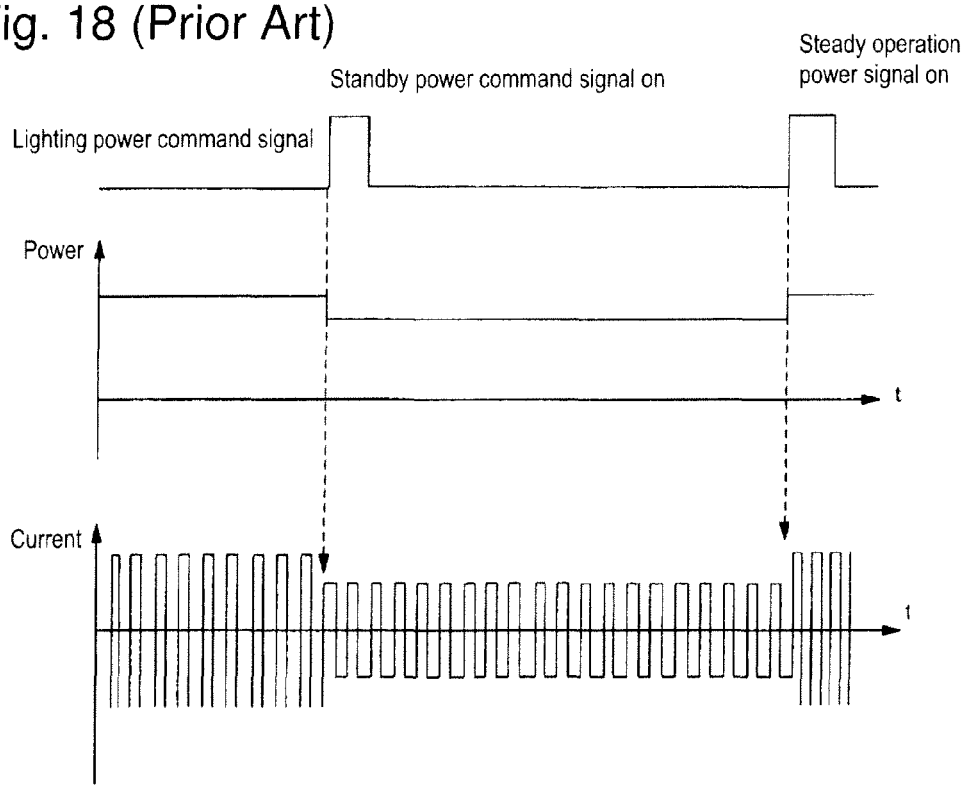
FIG. 18 is a schematic view showing one example of the waveform of electric current flowing through a conventional discharge lamp.

FIG. 16 is a control flow diagram of when the standby power lighting operation continues for a period longer than a preset fixed period T2. FIG. 17 shows a time chart for the operation power command signal, power and current. As shown in FIGS. 16 & 17, when there is no change in the image signal for a period longer than a fixed period T1 during the steady operation time, a signal for selecting the standby power operation mode is transmitted from the lighting control unit 31b in the projector control unit 31, and the light source device 30 is changed to the standby power operation mode based on this signal. Furthermore, when the standby power operation continues for a period longer than a fixed period T2, a signal for turning off the high-pressure discharge lamp is transmitted from the lighting control unit 31b in the projector control unit 31.

This function makes it possible to leave a projector on when a user stopped using the projector in the state of the standby lighting operation. This is because a user may wrongfully think that he/she has turned off the lamp during the standby lighting operation in part because the operation power is low and in part because the polarization direction of a liquid crystal display device in an image display means may be turned off. Particularly, such a mistake may occur in the case of hanging a projector from the ceiling (i.e., the projector is not disposed at hand).

Another effect of the standby power operation is the improvement of the abovementioned contrast ratio. This is an important factor for a projector in addition to the brightness of the screen because an increased contrast ratio means that an image can be clearly projected. When a liquid crystal element is used as an image display means, for example, the contrast ratio is generally about 500:1 though it depends on the efficiency of the liquid crystal element. As used herein, 500:1 refers to the ratio of the brightness of the screen when a white image is projected to the brightness of the screen when a black picture is projected. It is possible to achieve substantially a contrast ratio of 2000:1 by operating with power that is 25% of the rated operation as the standby power operation while the black picture is projected, for example. In reality, it is possible to achieve a contrast ratio exceeding 2000:1 because the light intensity goes further down compared with the power ratio as the operating pressure declines due to the non-evaporated mercury.

In the abovementioned embodiment, a liquid crystal element was used as an image display means. However, a DLP (digital light processor) with a DMD (digital micro mirror device) may also be used. In the case of a DLP projector, a higher contrast ratio can generally be achieved compared with a projector using a liquid crystal element. Nevertheless, the contrast ratio can further be improved in combination with the present invention.

What is claimed is:

1. A high-pressure discharge lamp light source device comprising:
a high-pressure discharge lamp having a discharge vessel made of quartz glass and containing a pair of opposed electrodes, mercury in a quantity of at least 0.20 mg/mm$^3$, halogen in a range of $10^{-6}$ μmol/mm$^3$ to $10^{-2}$ μmol/mm$^3$, and a prescribed amount of rare gas sealed therein and
a power supply device having an operating state for operating the high-pressure discharge lamp and a standby state, said power supply device being adapted to supply rectangular wave alternating current in said operating state and having a direct current drive which is adapted to provide direct current in said standby state of at most 0.5×P (W) with respect to the maximum operating power P (W) during steady operation except for an initial operation period immediately after starting an operation by means of the direct current drive, and a switching state in which is performed a switching from the direct current drive to an alternating current drive in case of operation with a higher power than 0.5×P (W) after said operation with a power of at most 0.5×P (W), and wherein at least one of the power and frequency of said alternating current is gradually increased and a transition to the steady-state lighting is performed.

2. The high-pressure discharge lamp light source device according to claim 1, wherein the power supply device is adapted to invert polarity from one polarity to another polarity during operation with direct current.

3. A projector having means for projecting images comprising a high-pressure discharge lamp, wherein the high-pressure discharge lamp comprises a discharge container made of quartz glass and containing a pair of opposed electrodes, mercury in a quantity of at least 0.20 mg/mm$^3$, halogen in a range of $10^{-6}$ mol/mm$^3$ to $10^{-2}$ μmol/mm$^3$, and a prescribed amount of rare gas sealed therein and a power supply device having an operating state for operating the high-pressure discharge lamp and a standby state, said power supply device being adapted to supply rectangular wave alternating current in said operating state and having a direct current drive which is adapted to provide direct current in said standby state of at most 0.5×P (W) with respect to the maximum operating power P (W) during steady operation except for an initial operation period immediately after starting an operation by means of the direct current drive, and a switching state in which is performed a switching from the direct current drive to an alternating current drive in case of operation with a higher power than 0.5×P (W) after said operation with a power of at most 0.5×P (W), and wherein at least one of the power and frequency of said alternating current is gradually increased and a transition to the steady-state lighting is performed.

4. The projector according to claim 3, further comprising a control for changing from the operating state at a power of more than 0.5×P (W) to the standby state operating at a power of most 0.5×P (W) when there is no change in an image signal of the projector for a certain period of time.

5. The projector according to claim 3, further comprising a control for automatically turning off the high-pressure discharge lamp the standby state operation with a power of at most 0.5×P (W) when there is no change in an image signal of the projector for a certain period.

* * * * *